United States Patent [19]

Diehl et al.

[11] Patent Number: 5,434,397
[45] Date of Patent: Jul. 18, 1995

[54] PROTECTION AGAINST THE NON-AUTHORIZED INHIBITION OF WRITING IN CERTAIN STORAGE AREAS OF A SMART CARD

[75] Inventors: Eric Diehl, Neudorf; Joël Hamon, Lipsheim; Michel Leduc, Boersch, all of France

[73] Assignee: Laboratoire Europeen de Recherches Electroniques Avancees, Societe en Nom Collectif, Courbevoie, France

[21] Appl. No.: 96,834

[22] Filed: Jul. 26, 1993

Related U.S. Application Data

[63] Continuation of Ser. No. 947,974, Sep. 21, 1992, abandoned, which is a continuation of Ser. No. 606,918, Oct. 31, 1990, abandoned.

[30] Foreign Application Priority Data

Nov. 3, 1989 [FR] France ............................ 89 14417

[51] Int. Cl.6 ............................................ G06F 11/30
[52] U.S. Cl. ........................................ 235/380; 371/62; 235/438; 235/492
[58] Field of Search ............... 235/379, 380, 382, 441, 235/492, 436, 437, 438; 340/825.06, 825.07, 825.08, 825.11, 652, 313; 365/189.01, 201; 371/16.3, 62

[56] References Cited

U.S. PATENT DOCUMENTS

| | | | |
|---|---|---|---|
| 3,906,460 | 9/1975 | Halpern | 235/439 |
| 4,610,013 | 9/1986 | Long et al. | 371/9 |
| 4,627,060 | 12/1986 | Huang et al. | 371/62 |
| 4,689,766 | 8/1987 | Kent | 371/62 X |
| 4,760,575 | 7/1988 | Watanabe | 371/21 |
| 4,780,602 | 10/1988 | Kawana et al. | 235/380 |
| 4,803,351 | 2/1989 | Shigenaga | 235/492 |
| 4,816,653 | 3/1989 | Anderl et al. | 235/380 |
| 4,816,654 | 3/1989 | Anderl et al. | 235/380 |
| 5,054,023 | 10/1991 | Kronberg | 371/16.3 |
| 5,175,840 | 12/1992 | Sawase et al. | 365/201 X |

FOREIGN PATENT DOCUMENTS

| | | |
|---|---|---|
| 2606199 | 5/1988 | France . |
| 58-050053 | 3/1983 | Japan .................. 371/16.3 |
| 63-25789 | 2/1988 | Japan . |
| 1-57390 | 3/1989 | Japan . |

Primary Examiner—Donald Hajec
Assistant Examiner—Edward H. Sikorski
Attorney, Agent, or Firm—Oblon, Spivak, McClelland, Maier & Neustadt

[57] ABSTRACT

To counter illicit prevention of the invalidation of a smart card in a pay television network, for example when the period of validity for the card has expired, a verification of the card reader's ability to write to the card's memory is made. This verification consists in periodically sending a data item to be stored in the card. A counter on the card is reset by the writing voltage of the card's storage. In the event the writing voltage does not reach the counter, the counter's overflow output is connected to a read inhibition circuit which blocks functions of the card.

7 Claims, 1 Drawing Sheet

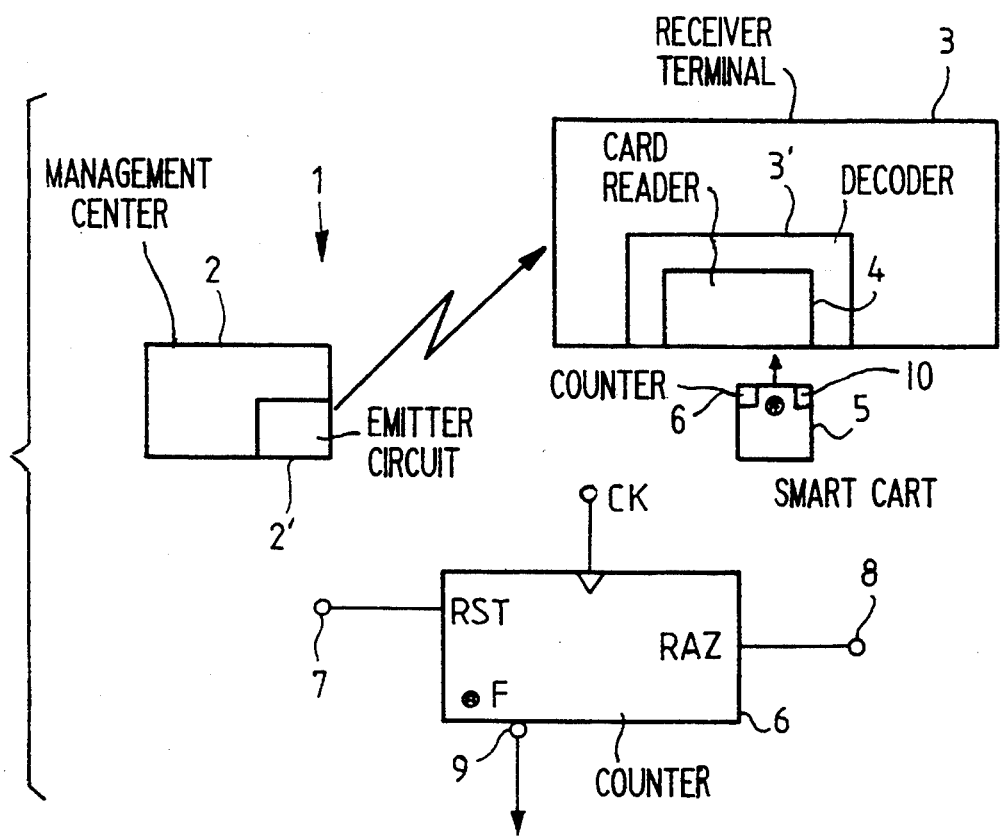

PROTECTION AGAINST THE NON-AUTHORIZED INHIBITION OF WRITING IN CERTAIN STORAGE AREAS OF A SMART CARD

This application is a Continuation of application Ser. No. 07/947,974, filed on Sep. 21, 1992, now abandoned, which is a Continuation of application Ser. No. 07/606,918, filed Oct. 31, 1990 now abandoned.

BACKGROUND OF THE INVENTION

This invention relates to a process for protection against the non-authorized inhibition of writing in certain storage areas of a smart card, and device for the use of the process.

In a pay-television network whereby the decoders are equipped with smart cards, when the card reaches the end of the period of validity or when it recognizes the need to inhibit definitively forged cards (which all have the same identity due to identical forging), the emitter sends a signal ordering end-of-validity data, or data inhibiting further access, to be entered into these cards. The writing signal used for this card operation appears on a given conductor within the decoder and is easily identified by a person wishing to pirate the card (generally, this conductor has a higher voltage than the card supply voltage). The simple action of cutting this conductor prevents the card from being invalidated.

A solution which is well-known in the art, recommended by the current Eurocrypt standard, consists in reserving in the area of card storage a zone in which the dates indicating the beginning and end of the validity period are written, a program ordering self-destruction of the card when the end of the period of validity has been reached (the emitter constantly indicates the current date to the card). However, memorizing this type of data in the card results in a considerable decrease in storage capacity, and in the data transmission capacity of the network.

The object of this invention is a process, straightforward and easy to apply, for the protection against the non-authorized inhibition of writing in certain storage areas of a smart card used in a network consisting of at least one management center or emitter, and at least one terminal or receiver equipped with the means to operate with smart cards.

A further object of this invention is a simple device for the use of the process.

SUMMARY OF THE INVENTION

The process appropriate to the invention, to be applied in a network corresponding to the above description, consists in sending a data item regularly to be entered into at least one storage location in the card, and then verifying immediately on the card that this data item has in fact been entered. An advantageous aspect is that this data item is a simple bit whose value can be altered randomly or pseudo-randomly. Thus, if a person cuts the contact used for writing to the card, or blocks in some way the writing, this will be quickly detected. Such detection may, for example, lead to a blockage thus preventing further transactions with this card.

The device for the use of the invention, to be applied to a network consisting of at least one management center and at least one terminal linked to this management center and which is equipped with a smart card reader, consists of the means to regularly produce, in the management center, a data item to be entered into the card, and in the terminal card reader, the means to transmit that data item to a card, and on the card the means to verify the writing of the data item; this checking means also controls the inhibition, preferably definitive, of at least one of the reading or writing means of the card.

BRIEF DESCRIPTION OF DRAWINGS

This invention will be more clearly understood by means of the detailed description of a mode of embodiment taken as a non-restrictive example and illustrated by the appended FIGURE which is a simplified block diagram representing a network in accordance with the invention.

DESCRIPTION OF THE PREFERRED EMBODIMENT

The invention is described hereafter with reference to a pay-television network, but obviously the invention is not restricted to this application, and may apply to any network which comprises a management/control center or emitter (herein, for reasons of simplification, called "management center") and at least one terminal or receiver (herein, for reasons of simplification, called "terminal"), linked to a management center by any appropriate means (cable, radio link, etc), the terminal being equipped with a smart card reading device.

The smart cards used in this type of network generally have a fixed period of validity (one or several months), in particular to limit the risks of forgery or "pirating".

The pay-television network 1, represented in a simplified manner in the FIGURE, includes a program emitter 2 and a large number of receivers. Only one of these receivers, 3, has been represented in the FIGURE. Receiver 3 includes in decoder 3', besides the usual circuits, a smart card reader 4. One card, 5, has been represented in the FIGURE.

In order to determine whether an ill-intentioned user has not blocked the writing voltage (generally 15 or 21 V DC) of the card being used, a repetitive signal (with a period between 2 and 4 s) which is to be entered into a defined storage area of the card 5 is produced by circuit 2' of emitter 2. This signal may be just a single bit "0" or "1", whose value is determined by means of a pseudo-random generator. The defined storage area can consist of several different locations chosen randomly, thus making it more difficult to detect the entry.

In card 5, a counter 6, which receives at its clock signal CK input the clock signals used by a microprocessor of the card 5, is used to detect the presence of the writing voltage of this card's storage. When the card 5 is loaded (by placing it in the reader 4) the input 7 of the initialization counter 6 receives a signal which sets the counter to zero. Input 8 for the reset of counter 6 receives the writing voltage of the card, which may be divided into an appropriate ratio (reducing it to 5 V for example). The "overflow" output 9 of counter 6 is connected to the control input of a read inhibition circuit 10 of card 5 or of some blocking system (for example, a gate inserted in the power supply circuit of the card's microprocessor).

The maximum count status of counter 6 is such that it corresponds, for example, to one or two periods of the repetitive signal. Therefore, if the writing to memory of card 5 (controlled by the repetitive signal) occurs in a normal way, counter 6 is reset to zero (input 8) by means of the writing of the repetitive signal, and never reaches its maximum count. If however, the maximum count is reached, an overflow signal appears at output 9 and the functions of card 5 are blocked.

What is claimed is:

1. A process for protection against the non-authorized inhibition of writing certain storage areas of a smart card used in a network consisting of at least one management center and at least one terminal linked to said management center, said process comprising the steps of:

sending a data item periodically from one of said at least one management center to said smart card and storing said data item in at least one of said storage areas of said card, providing an immediate verification to check that the data item has in fact been written in said at least one storage area of said card including the step of detecting the presence of a writing voltage on said card, and blocking at least one function of the card if said data item has not been written.

2. Device for protection against the non-authorized inhibition of writing in certain storage areas of a smart card having a card inhibition circuit used in a network including at least one management center and at least one card reader terminal, said device comprising:

a means to produce on a regular basis a data item and to send said data item to said at least one card reader terminal wherein said means to produce and to send is located on said management center;

means, located on said card reader terminal, for transmitting said data item to a first connector of said card;

means, located on said card reader terminal, for generating an appropriate card writing voltage to be transmitted to a second connector of said card;

means, located on said card, for verifying that said card has received said writing voltage wherein said verifying means includes a counter supplied with clock signals from said card, and a reset input wherein said reset input is connected to said second connector;

wherein said verifying means is connected to said card inhibition circuit whereby if said card writing voltage is not received by said card, said inhibition circuit outputs a signal which inhibits at least one function of said card.

3. Device according to claim 2, wherein said card inhibition circuit is a card read inhibition circuit.

4. Device according to claim 2, wherein said card inhibition circuit is a logic gate cutting off the power supply of the microprocessor of said card if said information is not written.

5. Device according to claim 2, wherein the lapse of time between two attempts to write said data item to said card is lower than a period of said counter.

6. Device according to claim 2, wherein the counter is reset when said card is inserted into said terminal card reader.

7. Device for protection against the non-authorized inhibition of writing in certain storage areas of a smart card, comprising:

means to generate a writing voltage on an appropriate connector of said card, means to verify that said writing voltage was received by said card, said verifying means being included on said card, said verifying means blocking at least one function of said card if said writing voltage has not been received, and said verifying means including a counter, said counter including an overflow output; said counter counting clock signals picked up in circuits of said card, said counter being reset when said writing voltage is present at said appropriate connector of said card, said overflow output controlling an inhibition circuit of said at least one function of said card.

* * * * *